United States Patent [19]
Anderson et al.

[11] 3,940,959
[45] Mar. 2, 1976

[54] SPARE TIRE LOCK

[76] Inventors: Edward J. Anderson, 27041 Pinjara Circle, Mission Viejo, Calif. 93452; Franklin E. Hinze, 3592 Mulford Ave., Lynwood, Calif. 90262

[22] Filed: Nov. 20, 1974

[21] Appl. No.: 525,292

[52] U.S. Cl. ................................................. 70/259
[51] Int. Cl. ............................................. E05b 65/12
[58] Field of Search ........... 70/181, 259; 224/42.06, 224/42.23, 42.24, 42.25; 248/203

[56] References Cited
UNITED STATES PATENTS 1,519,751   12/1924   Baker.............................. 224/42.24
1,688,187   10/1928   Jackson et al. ......................... 70/51

*Primary Examiner*—Richard E. Moore
*Attorney, Agent, or Firm*—Ronald L. Juniper

[57] ABSTRACT

A locking device for spare tires which includes a specially formed mounting post for the tire, a base plate for the post, a locking disk engaging the tire and a lock fitted on the post to hold the disc and tire securely.

8 Claims, 6 Drawing Figures

SPARE TIRE LOCK

BACKGROUND OF THE INVENTION

Because of the prevalence of thefts of vehicle spare tires from exposed locations on trucks, it has become increasingly important to lock them securely in place. The existing locking means, before this invention, were, generally, too easily breached. Thus, the need arose to develop a relatively inexpensive, but very secure method and apparatus for locking exposed spare tires. This purpose was accomplished by the invention hereinafter described.

SUMMARY OF THE INVENTION

Briefly, this spare tire lock includes a base plate which is welded to the spare tire carrier on a vehicle such as a heavy truck. The base plate carries a mounting post which extends outwardly perpendicular to the base plate and is formed with a groove and an adjacent notch to fit a padlock near its free end. The spare tire is centered on this mounting post, and slid down against the base plate. Then a mounting plate with a hole to fit the mounting post is slid down on top of the spare tire and a padlock is fitted around the mating groove and notch of the mounting post to secure the spare tire in place.

DETAILED DESCRIPTION OF THE DRAWINGS

DETAILED DESCRIPTION OF THE INVENTION

Figure 1:
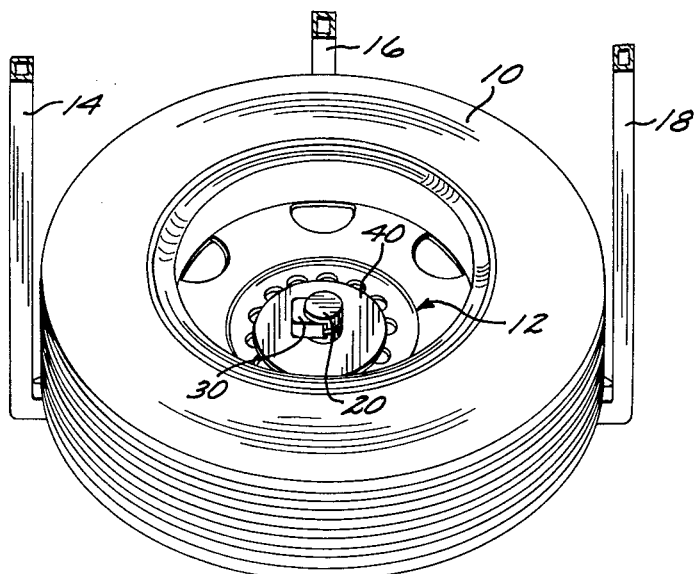
FIG. 1 is an isometric view of a spare tire mounted on its carrier in place with the special lock securing it thereon in accordance with this invention.
Figure 2:
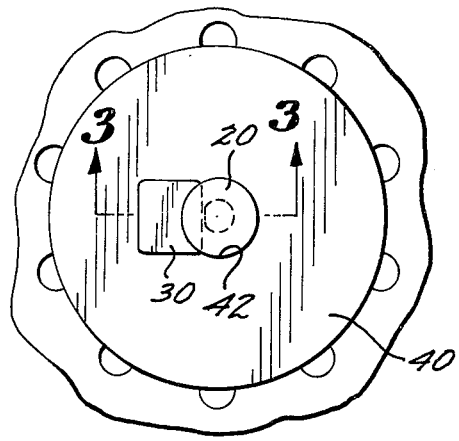
FIG. 2 is a fragmented top plan view showing the central hub portion of a wheel and mounted tire locked on the mounting post of this invention as in FIG. 1.
Figure 3:
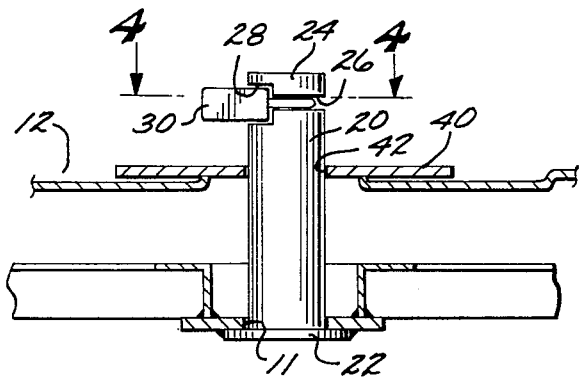
FIG. 3 is a fragmented cross-sectional view taken through 3—3 in FIG. 2 showing the mounting post with padlock recessed therein and a disc-type mounting plate positioned on the hub of the spare tire.
Figure 4:
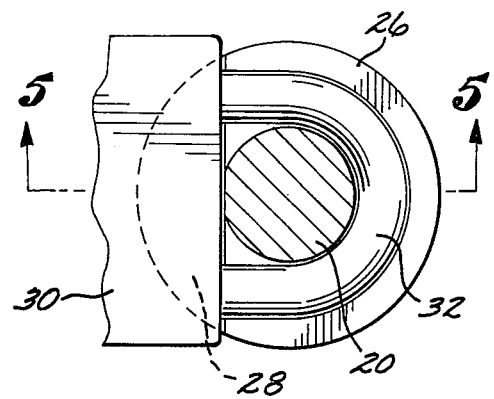
FIG. 4 is an enlarged, fragmented top sectional view taken through 4—4 in FIG. 3, showing the padlock and relative relationship of the mounting post recess when secured therein.

As shown in FIG. 1 a spare tire 10 and its wheel hub 12 are carried by a spare tire carrier within its spaced upright arms 14, 16 and 18, normally secured to a vehicle, such as a truck (not shown). The spare tire 10 is inverted from its normal position so that the side of the wheel hub 12 closest to the outside edge is placed down adjacent to the base of the spare tire carrier.

Figure 5:
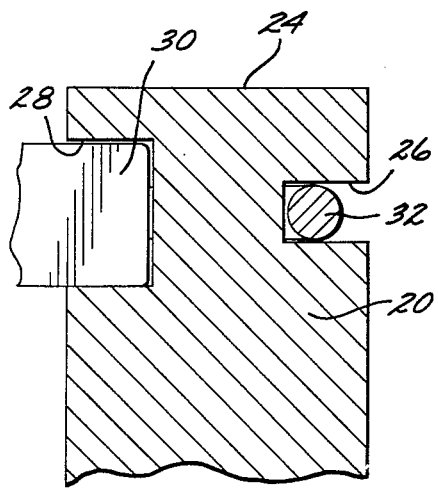
FIG. 5 is a fragmented sectional view taken through 5—5 in FIG. 4.

Centered within the spare tire carrier and extending upright therefrom is a cylindrical mounting post 20 with a diameter slightly smaller than the inside axially positioned center hole 11 in hub 12. Post 20 is secured upright on the carrier at its bottom by attachment to base plate 22. Carved into the free outer end 24 of the post 20 is a notch 26 which is an enlarged portion of a circumferential groove 28 adapted to matingly receive and hold, respectively, a locked padlock 39 and its shackle 32. As best viewed in FIG. 5, the depth of the groove 26 is sufficiently greater than the thickness of the shackle 32, so that shackle 32 is recessed completely within it. The curvature of the shackle 32 and the groove 26 are substantially the same. The width of the groove 26 is just slightly wider than the diameter of the shackle 32, and the notch 28 is shaped to matingly receive the portion of the padlock 30 from which the shackle 32 extends. Thus, when padlock 30 is locked in place within notch 28, it is held tightly therein and shackle 32 is completely recessed below the surface of post 20. The length of the post 20 from its base plate 22 to its groove 26 is only slightly greater than the width of the hub 12 mounted thereon, so that there is not space enough left to get in normal mechanical cutting tools.

A holding plate adapted to the size of the particular spare tire being carried has a center hole mating with and slightly larger than the post 20. The holding plate takes the form of a disc 40 with center hole 42 in FIGS. 1 through 5.

Figure 6:
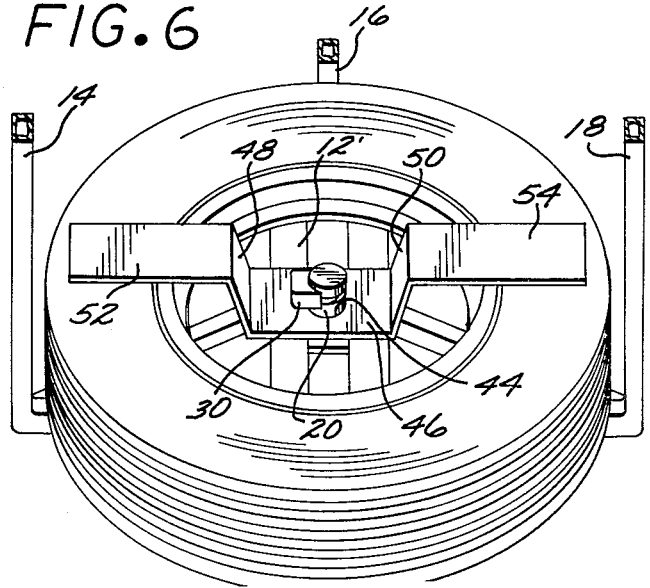
FIG. 6 is an isometric view of a modified form of this invention wherein the mounting plate is formed as a structure with a pair of gull-shaped wings adapted to abut against the outer opposite peripheral portions of the tire when lodged in place.

In FIG. 6, the holding plate is modified to a somewhat gull-shape having the center hole 44 cut in a flat center section 46 with upright connecting sections 48 and 50 bent upward at each end. From these connecting sections 48 and 50 extending wing sections 52 and 54, respectively, protrude roughly parallel to the center section 46. The connecting sections 48 and 50 rise just enough relative to the center section 46 that the wing sections 52 and 54 lodge against the outer periphery of a spare tire 10' when mounted in place. That is, the height of the connecting sections 52 and 54 is slightly greater than the distance from the inside of the wheel hub 12' to the outer remote periphery of the tire 10'. The connecting sections 48 and 50 are spaced to rise within the hub 12' and the wing sections 52 and 54 extend far enough to overlap onto the spare tire 10'.

In use, a spare tire 10 which is to be mounted on a vehicle carrier, is inverted with its hub center hole 11 aligned with post 20 and slid thereon within the carrier arms 14, 16 and 18. Then a mounting plate, such as disc 40, is slid onto the hub 12 with post 10 protruding up through its center hole 42. This is secured in place by lodging shackle 32 in groove 26 and closing padlock 30 so that it fits securely in notch 28. The modified form of FIG. 6 is secured in place in a like manner.

The invention elements are all made of extremely hard, tough material, such as steel, so that breaking or cutting is extremely difficult. The recessing of the lock shackle in the post groove prevents easy cutting at this point. The close spacing between the holding plate and padlock prevents entry of mechanical cutting or breaking tools in this area. Thus, a very secure device for stopping spare tire theft is provided which is inexpensive and easy to use.

Though concentration has been made herein on the description of a preferred embodiment of this invention (with one modification), it is understood that all forms of this invention which are within the spirit of the following appended claims are intended to be covered within limitation to the specific structures shown.

What is claimed is:

1. A combination spare tire, wheel and lock including: a padlock with a shackle; a mounting post for receiving a spare tire, said post having a base end for securing it and a free end having an adjacent circumferential groove adapted to receive and enclose said padlock shackle; and a mounting plate having a hole smaller than said padlock, but large enough to receive said mounting post; wherein a spare tire on a wheel hub secured by said lock is axially mounted on said post inverted from a conventional mounting so that its most exterior hub portion is adjacent the base end of said post, said mounting plate is on said post adjacent to said spare tire and said padlock with its shackle are locked into said post groove over said mounting plate close enough together that no entry of cutting tools is possible between the aforementioned elements.

2. A spare tire lock as defined in claim 1 wherein said circumferential groove on said mounting post is deeper than the diameter of said shackle, curved substantially the same as said shackle and provided with a notch positioned and shaped to mate with and receive the locking portion of said padlock when secured therein.

3. A spare tire lock as defined in claim 2 wherein the mounting plate is a disc fitting within the hub of a wheel to be secured thereby.

4. A spare tire lock as defined in claim 2 wherein the mounting plate is formed with a pair of raised extending wing portions adapted to bear against the outside of a mounted tire.

5. A spare tire lock as defined in claim 5 wherein said wing sections are attached by raised connecting sections on opposite ends of a center section.

6. A spare tire lock as defined in claim 5 wherein said wing sections extend out into about the same plane and are substantially parallel with said center section.

7. A spare tire lock as defined in claim 1 in combination with a vehicle wherein the base of said mounting post is secured to said vehicle so that said post extends out generally perpendicular thereto.

8. A spare tire lock as defined in claim 7 wherein a base plate is secured to the base portion of said mounting post.

* * * * *